(12) United States Patent
Dobie

(10) Patent No.: US 10,449,471 B1
(45) Date of Patent: Oct. 22, 2019

(54) UNDERDRAIN ASSEMBLY FOR WASTEWATER TREATMENT

(71) Applicant: W. Keith Dobie, Humarock, MA (US)

(72) Inventor: W. Keith Dobie, Humarock, MA (US)

( * ) Notice: Subject to any disclaimer, the term of this patent is extended or adjusted under 35 U.S.C. 154(b) by 164 days.

(21) Appl. No.: 15/710,033

(22) Filed: Sep. 20, 2017

Related U.S. Application Data

(60) Provisional application No. 62/396,882, filed on Sep. 20, 2016.

(51) Int. Cl.
*B01D 24/24* (2006.01)
*B01D 24/22* (2006.01)
*B01D 24/46* (2006.01)

(52) U.S. Cl.
CPC ............. *B01D 24/24* (2013.01); *B01D 24/22* (2013.01); *B01D 24/4631* (2013.01)

(58) Field of Classification Search
CPC .... B01D 24/22; B01D 24/24; B01D 24/4631; C02F 1/001; C02F 2301/00
See application file for complete search history.

(56) References Cited

U.S. PATENT DOCUMENTS

| | | | |
|---|---|---|---|
| 1,455,505 A | 5/1923 | Paterson | |
| 1,569,896 A * | 1/1926 | Tanner | B01D 24/001 |
| | | | 210/292 |
| 1,751,819 A | 3/1930 | Kniesel | |
| 1,871,122 A | 8/1932 | Kretzschmar | |
| 3,468,422 A | 9/1969 | Camp | |
| 4,923,606 A | 5/1990 | Gresh et al. | |
| 5,534,202 A | 7/1996 | Roberts et al. | |
| 5,673,481 A | 10/1997 | Roberts et al. | |
| 6,261,453 B1 | 7/2001 | Savage | |

FOREIGN PATENT DOCUMENTS

DE    2847076 A1 *  5/1980  ............. B01D 24/24

* cited by examiner

*Primary Examiner* — Matthew O Savage
(74) *Attorney, Agent, or Firm* — John P. McGonagle

(57) ABSTRACT

An underdrain assembly in a wastewater filtration unit for providing even distribution of liquid and gas during filter backwashing operations and the uniform collection of filtered water during the normal operation of the filtration unit is provided. The underdrain assembly is provided with a flat, concrete plate with a perimeter matching the shape of the filtration unit. The concrete plate has a plurality of holes with individual PEX tubes in each hole extending from the concrete plate top surface through and protruding below the plate.

5 Claims, 10 Drawing Sheets

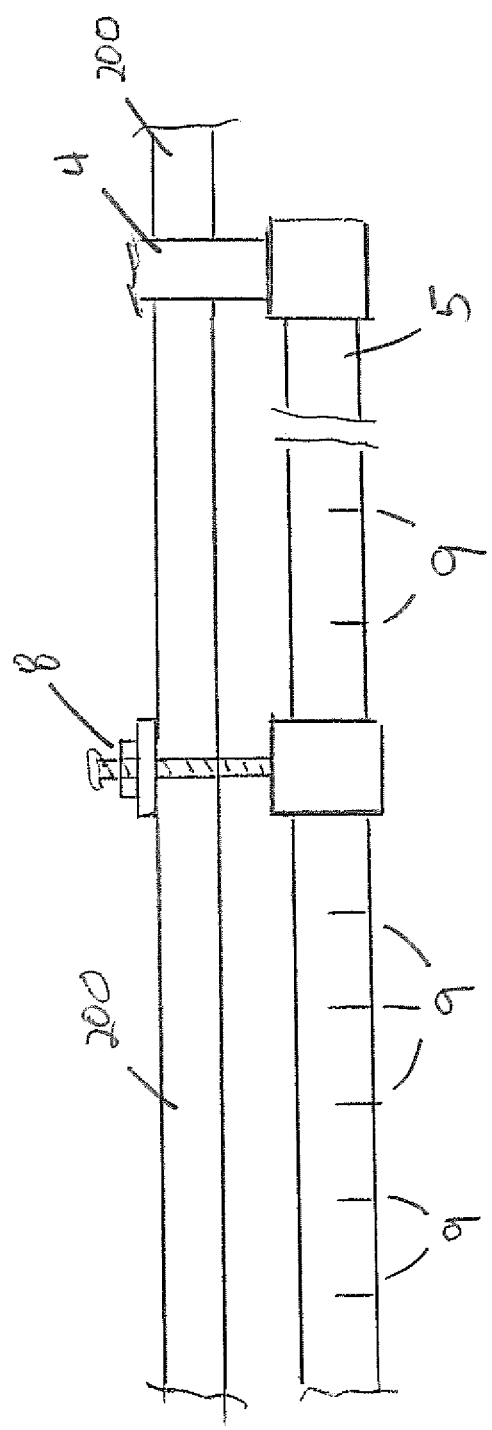

UNDERDRAIN ASSEMBLY FOR WASTEWATER TREATMENT

BACKGROUND OF THE INVENTION

This invention relates to wastewater treatment, and in particular, to an underdrain assembly for supporting filter media and providing means for air flow to move through the filter media.

It is desirable to provide wastewater filtration units with means, such as underdrains, for providing even distribution of liquid and gas during filter backwashing operations and the uniform collection of filtered water during the normal operation of filtration units. It is also desirable to provide supporting means for the filter media such that the filter media is spaced apart from the bottom of the filtration unit. This provides a space for the pipes which comprise a portion of the water and air distribution system which is situated below the filter media. It also physically separates the filter media from the water and air distribution pipes. This helps prevent clogging of the orifices in the pipes by the finer particles of the filter media as well as removing the weight load of the overlying filter media from the pipes. Prior art underdrains are generally made from stainless steel. This is expensive.

SUMMARY OF THE INVENTION

The present invention replaces the prior art stainless steel underdrain with one or more, flat, precast concrete plates. Each underdrain plate has a plurality of holes formed therein and reaching from a plate undersurface to a plate top surface. Each hole has a tube extending from the concrete plate top surface through each hole and protruding below the concrete plate undersurface. The tubes provide means for the passage of air below the underdrain plate to pass through the underdrain plate and through the filter media resting on the underdrain plate. The plate undersurface has ridges formed therein, forming air pockets into which the tubes terminate. This provides balance to the air stream flowing up into the filter media.

These together with other objects of the invention, along with various features of novelty which characterize the invention, are pointed out with particularity in the annexed disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 12 is a side view, in section, of a multiple underdrain plate assembly.

DETAILED DESCRIPTION OF INVENTION

Figure 1:
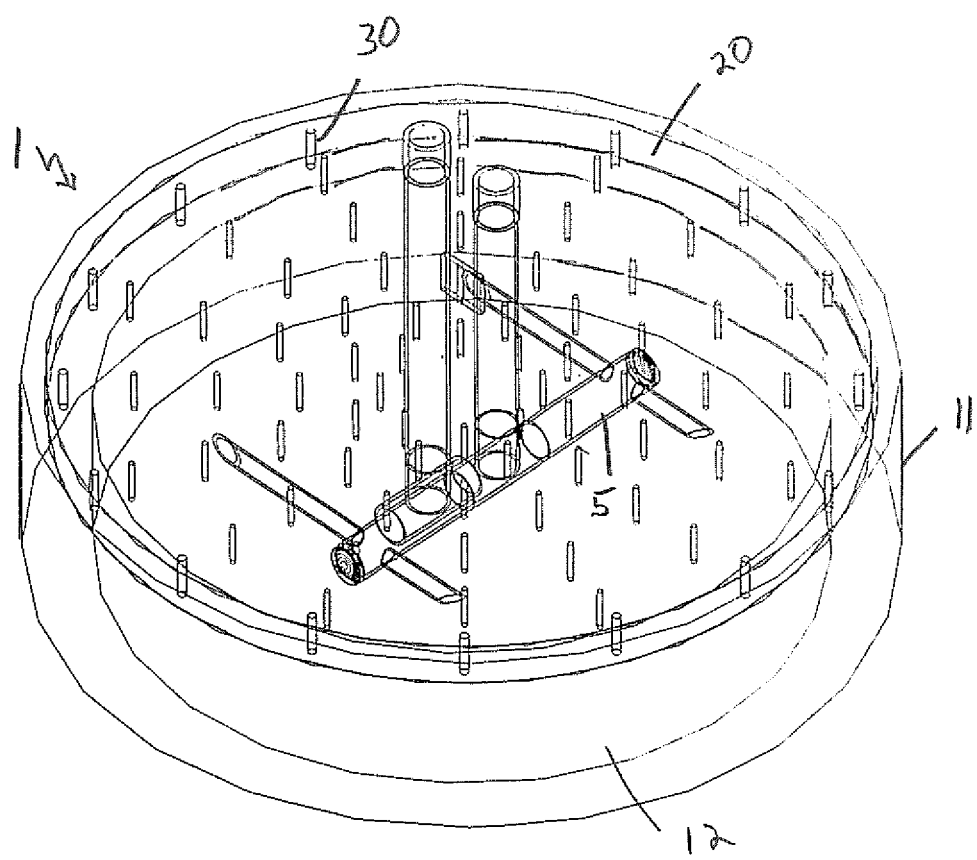
FIG. 1 is perspective view of the invention underdrain assembly.
Figure 2:
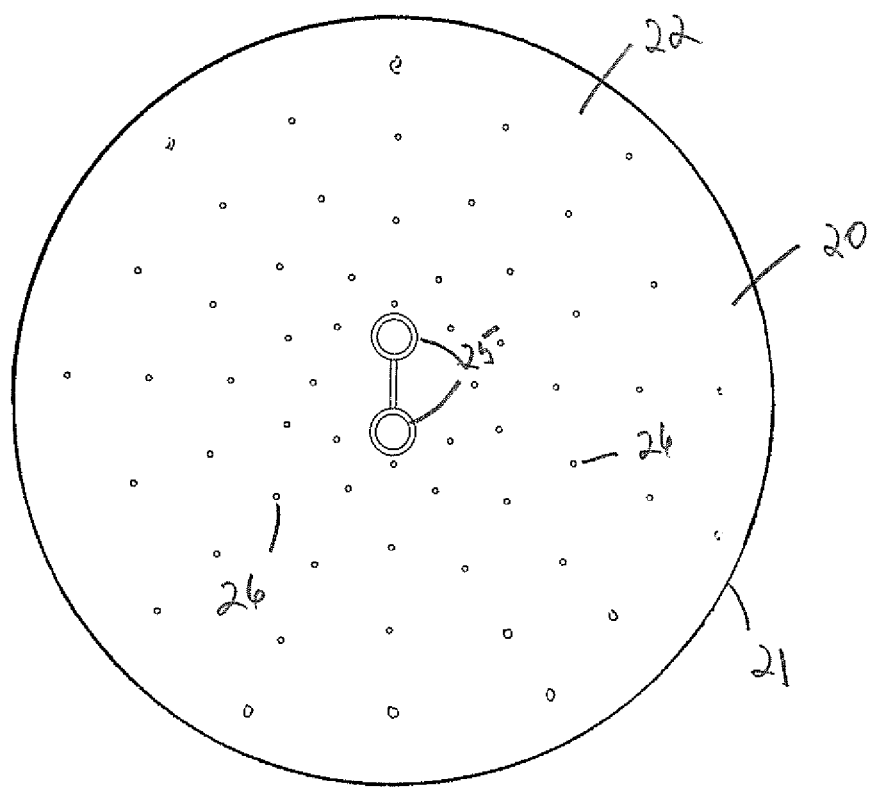
FIG. 2 is a top view of the underdrain concrete plate.
Figure 3:
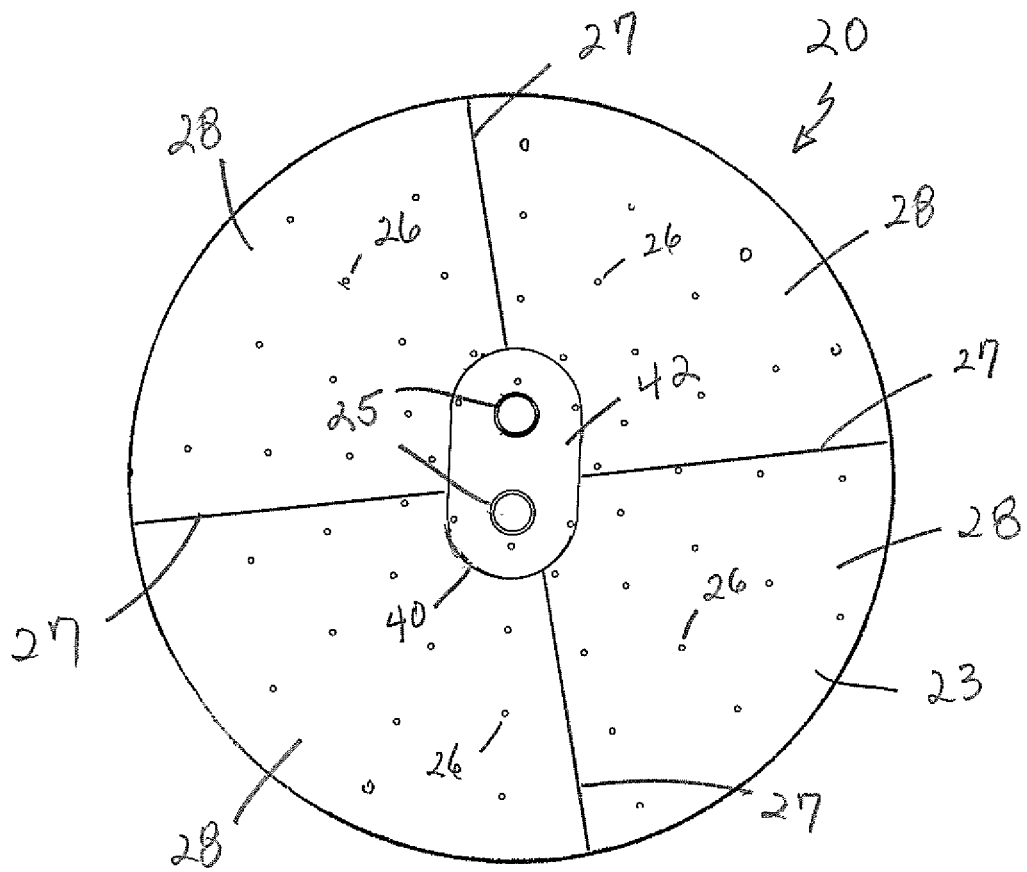
FIG. 3 is a bottom view of the underdrain concrete plate with a bearing plate.
Figure 4:
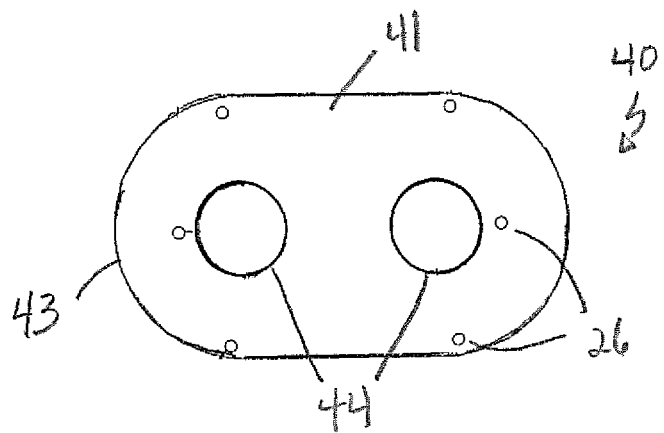
FIG. 4 is a top view of the bearing plate.
Figure 5:
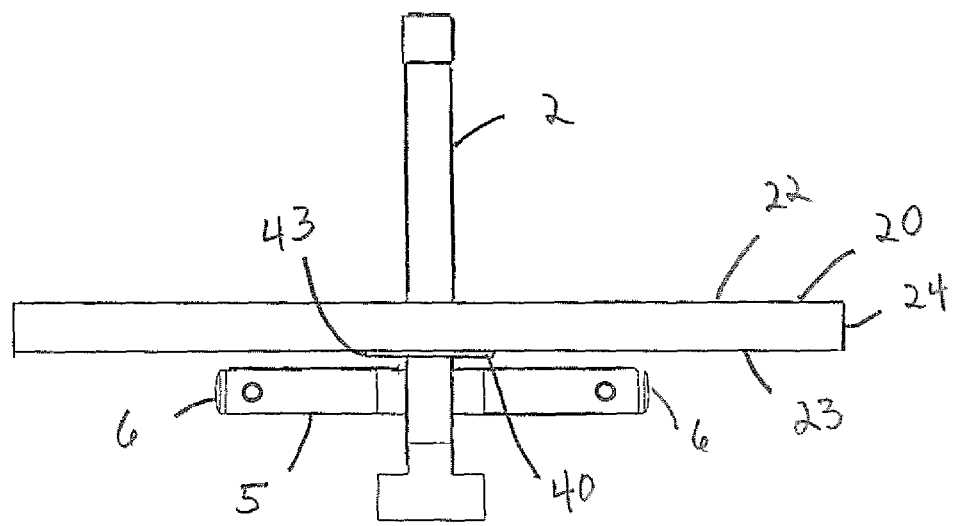
FIG. 5 is a side view of the underdrain assembly.
Figure 6:
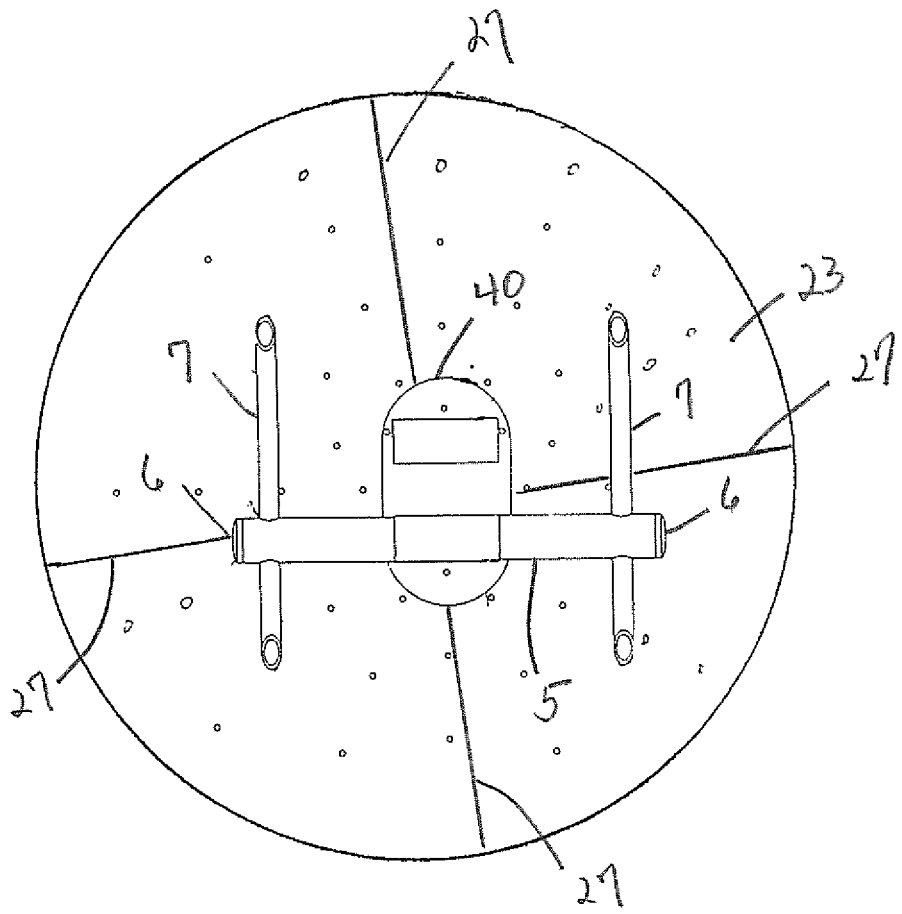
FIG. 6 is a bottom view of the underdrain assembly shown in FIG. 1.
Figure 7:
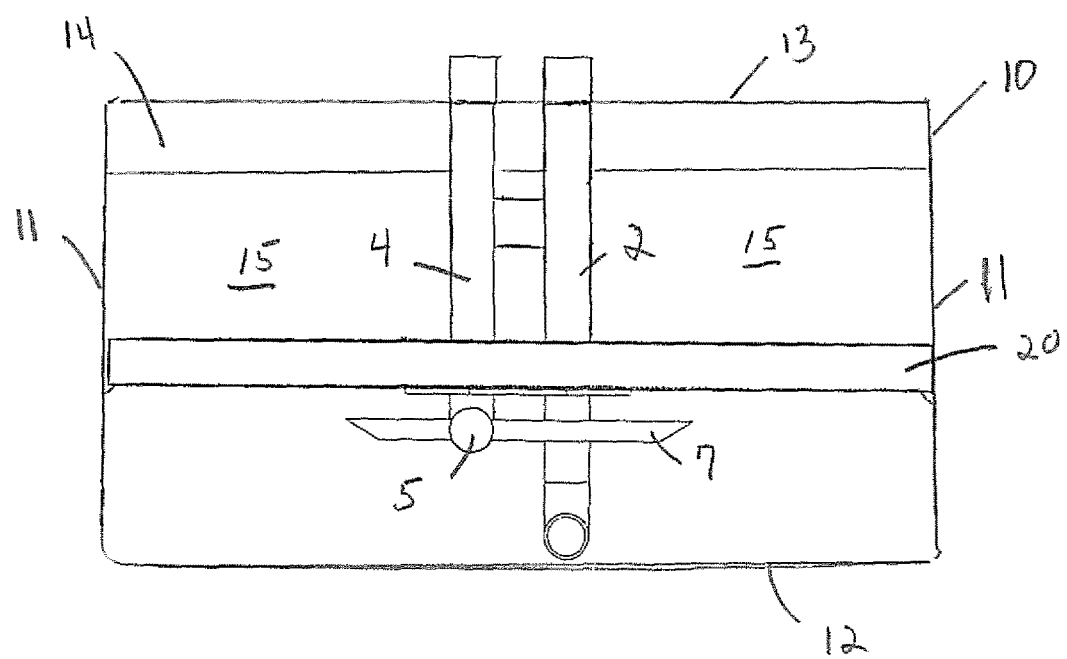
FIG. 7 is a front view of the underdrain assembly.
Figure 8:
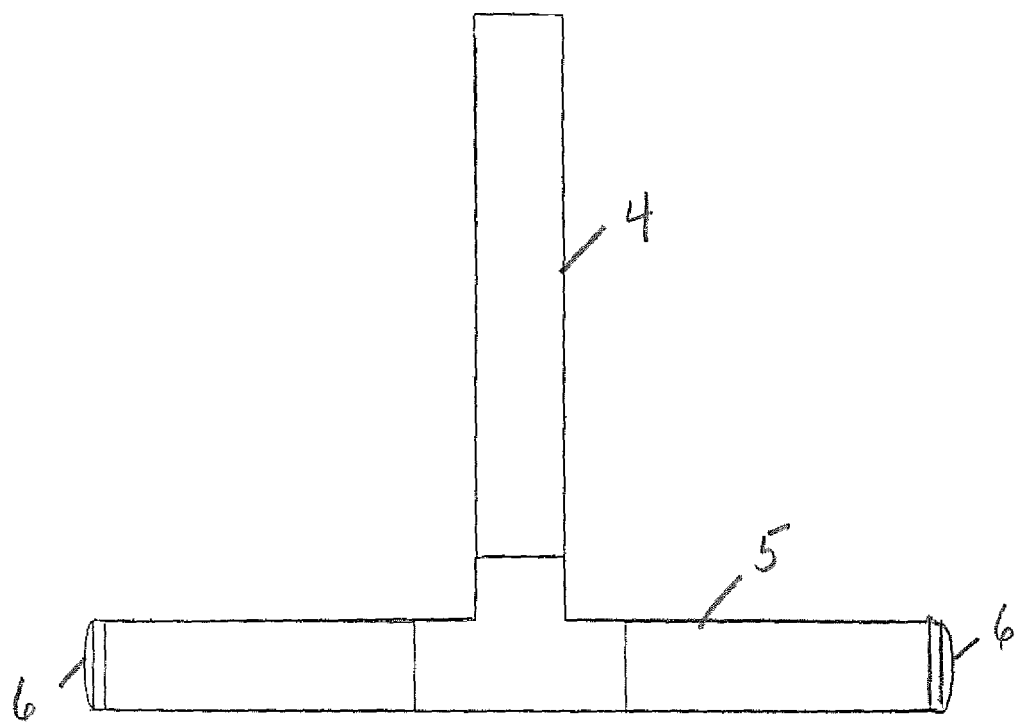
FIG. 8 is a front view of the air pipe assembly.
Figure 9:
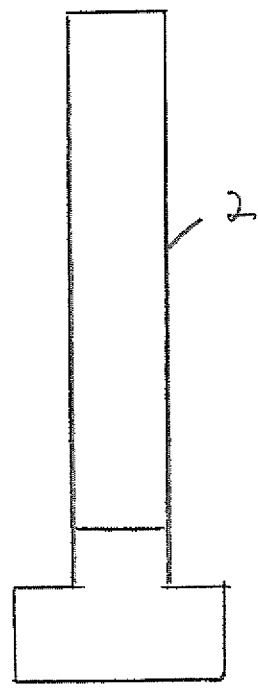
FIG. 9 is a front view of the water pipe assembly.
Figure 10:
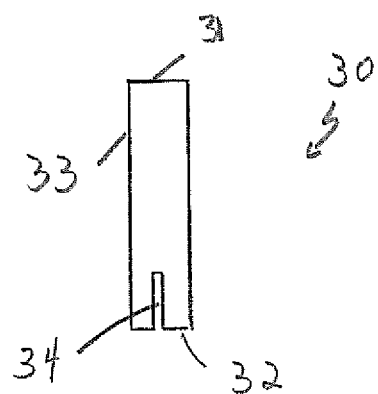
FIG. 10 is a plan view of a PEX tube.
Figure 11:
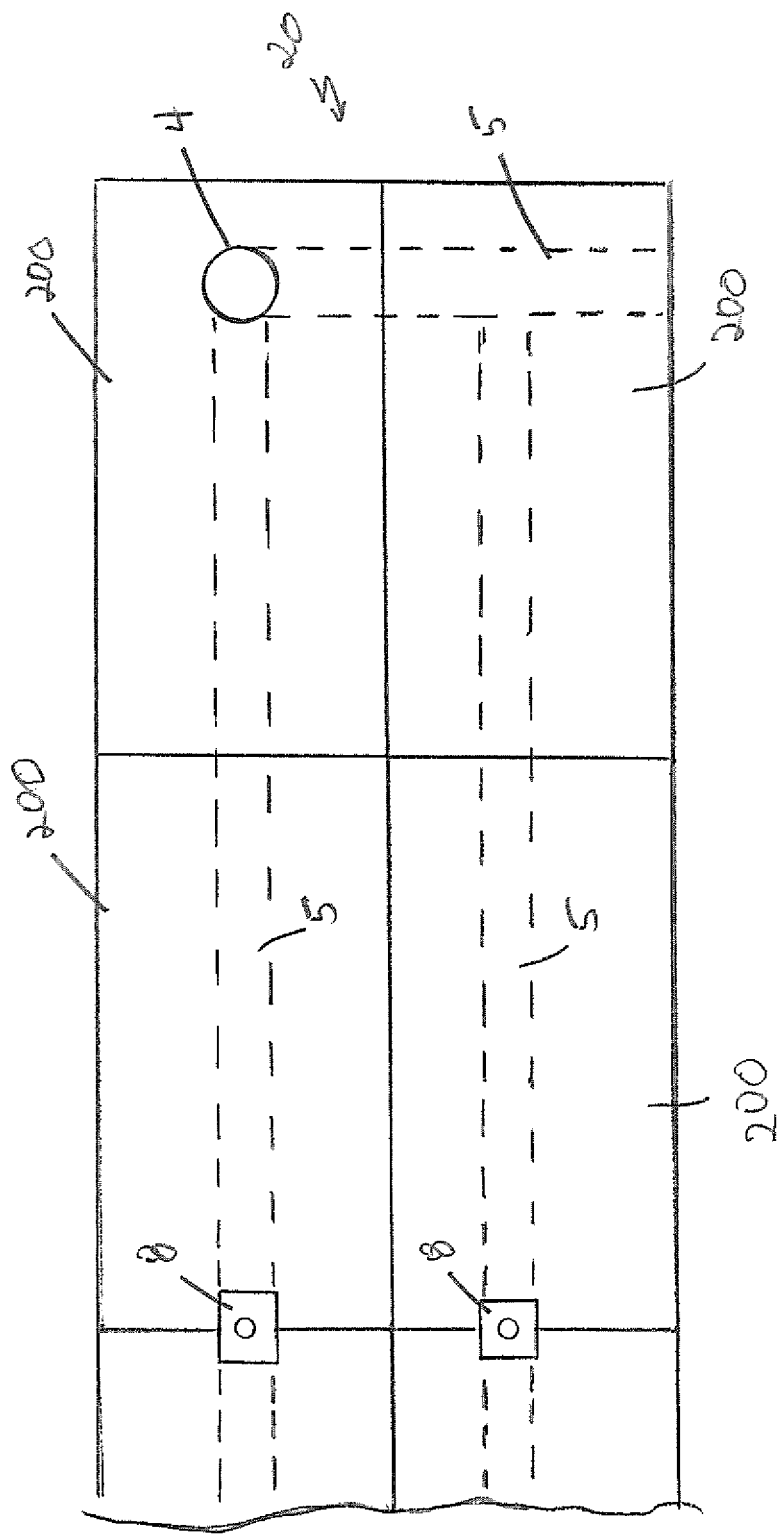
FIG. 11 is a top view, in section, of a multiple underdrain plate assembly.

Referring to the drawings in detail wherein like elements are indicated by like numerals, there is shown an underdrain assembly 1 constructed according to the principles of the present invention. The underdrain assembly 1 is positioned within a filtration unit 10 and supports filter media 15. The invention underdrain assembly 1 is comprised in part of at least one, flat, precast concrete underdrain plate 20 with a circumference 21 to match the shape of the filtration unit 10 in which it is placed. The underdrain plate 20 may be cylindrical, square, or rectangular in shape, and may be configured singularly or in a multiple arrangement of plates for larger reactors. For purposes of exposition, the filtration unit 10 is generally designated as having a cylindrical shape, with a cylindrical side wall 11 extending from a bottom 12 to a top 13, said side wall, bottom and top defining a filtration unit interior 14. The underdrain plate 20 in this example is singular and has a top surface 22 and an opposite bottom surface 23. The underdrain plate 20 has a thickness defined by a circumferential wall 24. The underdrain plate 20 has two, generally central, cylindrical apertures 25 formed therein, said apertures adapted to receive two pipes, one for water 2 and one for air 4, said pipes extending through the concrete plate apertures 25. The plate bottom surface 23 has one or more ridges 27 protruding downward formed therein, each ridge having an approximate one inch depth. The ridges 27 form air pockets 28 beneath the plate bottom surface 23.

The underdrain plate 20 has a plurality of holes 26 formed therein and extending from an underdrain plate bottom surface 23 through an underdrain plate top surface 22. Each hole 26 has a tube 30 extending from the underdrain plate top surface 22 down through each hole and protruding below the underdrain plate undersurface 23 into an air pocket 28. The tubes 30 provide means for the passage of air below the underdrain plate bottom surface 23 through the underdrain plate top surface 22 and through filter media 15 resting on the underdrain plate top surface 22.

The tubes 30 are preferably made from cross-linked polyethylene, commonly abbreviated PEX. Each tube 30 is hollow and has an open top 31, an open bottom 32, and a cylindrical side wall 33 extending from the bottom to the top. The tube top 31 is generally flush with the concrete plate top surface 22. The tube side wall 33 has a two, opposite, vertical slots 34 extending from the tube bottom 32 toward the tube top 31 a desired distance. The tube slots 34 help distribute air more evenly under low air flow conditions. As an air pocket under the underdrain plate 20 increases in depth, it engages the tube slots 34 first and the slots start to act as a restricting orifice. The restriction allows the air pocket to grow, while still passing a small amount of air, insuring that the slots on all tubes are engaged even if slightly out of level. As the air pocket deepens, the flow through the slots increase as more of the length of the slots are exposed to the air pocket. Under high flow conditions the full inside diameter of the tubes are engaged by the air pocket and much higher air flow is allowed.

The underdrain assembly 1 is further comprised of a bearing plate 40. The bearing plate 40 has a top surface 41, a bottom surface 42 and a circumferential side wall 43. The bearing plate top surface 41 engages the underdrain plate bottom surface 23. The bearing plate 40 also has two, generally central, cylindrical apertures 44 formed therein, said apertures 44 corresponding to the underdrain plate central apertures 25.

The water pipe 2 extends from the filtration unit top 13, down through the filter media 15, through one of the underdrain plate central apertures 25, and extending adjacent the filtration unit bottom 12. The air pipe 4 extends from the filtration unit top 13, down through the filter media 15, through the remaining underdrain plate central apertures 25, and extending below the bearing plate 40. The air pipe 4 terminates in a lateral air pipe 5 positioned beneath the bearing plate 40, parallel to the filtration unit bottom 12. The lateral air pipe 5 has a transverse diffuser pipe 7 near to each lateral air pipe end 6.

In an invention embodiment with a plurality of underdrain subplates 200 comprising the underdrain plate 20, the lateral air pipe 5 may be connected to the underdrain subplates 200 by means of an adjustable connector 8 allowing a non-fixed end of the lateral air pipe to be raised or lowered, thereby providing leveling means for the lateral air pipe. The lateral air pipe has a plurality of slots 9 formed in the lower circumference, thereby providing even distribution of air from the lateral air pipe 5.

It is understood that the above-described embodiment is merely illustrative of the application. Other embodiments may be readily devised by those skilled in the art which will embody the principles of the invention and fall within the spirit and scope thereof.

I claim:

1. In a wastewater treatment system having a filtration unit with a top, bottom, sidewalls and a filtration unit interior, an underdrain assembly within the filtration unit interior for supporting filter media and providing means for air and water flow to move through the filter media, comprising:
   a flat, precast concrete underdrain plate having a top surface, an opposite bottom surface, a perimeter matching the shape of the filtration unit in which the plate is placed, and a thickness defined by a plate circumferential wall, said plate having a plurality of holes formed therein and extending from the plate bottom surface to the plate top surface, said plate bottom surface having a plurality of downwardly extending ridges forming a plurality of air pockets beneath the plate bottom surface;
   wherein the underdrain plate has two, generally central, cylindrical apertures formed therein, said apertures adapted to receive two pipes, one for water and one for air, said pipes extending through the plate apertures;
   wherein each hole has a hollow tube extending from the underdrain plate top surface down through each hole and protruding below the underdrain plate undersurface into an air pocket, each said tube providing means for the passage of air below the underdrain plate bottom surface through the underdrain plate top surface and through filter media resting on the underdrain plate top surface.

2. An underdrain assembly as recited in claim 1, wherein:
   each tube has an open top, an open bottom, and a cylindrical side wall extending from the bottom to the top, said tube top being generally flush with the concrete plate top surface, each tube side wall having two, opposite, vertical slots extending from the tube bottom toward the tube top a desired distance, said tube slots distributing air more evenly under low air flow conditions.

3. An underdrain assembly as recited in claim 2, further comprising:
   a bearing plate having a top surface, a bottom surface and a circumferential side wall, said bearing plate top surface engaging the underdrain plate bottom surface, said bearing plate also having two, generally central, cylindrical apertures formed therein, said apertures corresponding to the underdrain plate central apertures.

4. An underdrain assembly as recited in claim 3, wherein:
   said water pipe extends from the filtration unit top, down through the filter media, through one of the underdrain plate central apertures and corresponding bearing plate apertures, and extending near to the filtration unit bottom;
   said air pipe extends from the filtration unit top, down through the filter media, through the remaining underdrain plate central apertures and corresponding bearing plate aperture, and extending below the bearing plate, said air pipe terminating in a lateral air pipe positioned beneath the bearing plate, parallel to the filtration unit bottom, each said lateral air pipe having a transverse diffuser pipe near to each lateral air pipe end.

5. An underdrain assembly as recited in claim 1, wherein:
   said tubes are preferably made from cross-linked polyethylene, commonly abbreviated PEX.

* * * * *